(12) United States Patent
Walden

(10) Patent No.: US 6,539,989 B1
(45) Date of Patent: Apr. 1, 2003

(54) OIL AND LIQUID MANIFOLD DRAIN

(76) Inventor: Fred C. Walden, P.O. Box 410, Southern Pines, NC (US) 28388

( * ) Notice: Subject to any disclaimer, the term of this patent is extended or adjusted under 35 U.S.C. 154(b) by 0 days.

(21) Appl. No.: 10/105,927

(22) Filed: Mar. 25, 2002

(51) Int. Cl.⁷ .................................................. B65B 1/04
(52) U.S. Cl. .......................... 141/106; 141/86; 141/98; 141/331; 141/340; 141/364; 141/375
(58) Field of Search ............................. 141/86, 98, 106, 141/331–334, 340, 364, 375; 184/1.5, 106

(56) References Cited

U.S. PATENT DOCUMENTS

| | | | |
|---|---|---|---|
| 637,963 A | * 11/1899 | Howard | 141/106 |
| 5,004,024 A | * 4/1991 | Rezmer et al. | 141/298 |
| 5,402,837 A | 4/1995 | Dietzen | |
| 5,522,437 A | * 6/1996 | Blackburn | 141/106 |
| 5,540,264 A | * 7/1996 | Harp | 141/106 |
| 5,560,404 A | 10/1996 | Blair et al. | |
| 5,653,271 A | 8/1997 | Brittain et al. | |
| 5,730,870 A | 3/1998 | Randolph | |
| 5,881,841 A | 3/1999 | Mason | |
| 5,975,244 A | 11/1999 | Mason | |
| 6,022,473 A | 2/2000 | Mickelson | |
| 6,273,155 B1 | 8/2001 | Cacho | |

* cited by examiner

Primary Examiner—J. Casimer Jacyna
(74) Attorney, Agent, or Firm—John D. Gugliotta

(57) ABSTRACT

An oil and liquid manifold drain system is provided as an apparatus that allows plastic oil containers to be drained completely before disposal. A plurality of ports are provided that hold oil cans or bottles in an upside down condition for a long period of time, envisioned to be hours. The ports can be hydraulically connected to a common manifold that would drain by gravity, back to a common container where the contents could be reused, recycled or disposed of properly. While specifically designed for motor oil, the invention could also be used for other liquids that are commonly sold in small size plastic containers and a percentage of the liquid remains clinging to the inside of the can or bottle after pouring.

5 Claims, 3 Drawing Sheets

OIL AND LIQUID MANIFOLD DRAIN

RELATED APPLICATIONS

The present invention was first described in Disclosure Document Number 499,399 filed on Sep. 6, 2001 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to liquid collection systems and the like and, more particularly, to a modularly expandable funneling system.

2. Description of the Related Art

Modern motor vehicle engines are a true engineering marvel. Their long-run run time between major maintenance is in stark contrast to engines of even a few decades ago which required constant adjustment and maintenance to keep them operational. While tuneups and major repair of modern engines are jobs best left to professionals, maintaining proper lubrication oil levels can be monitored and maintained by the owners themselves as it is not a labor intensive procedure. Such a procedure usually utilizes four to five quart size containers of oil that are poured into the engine. While the vast majority of the oil leaves the bottle or can, a good percentage remains behind, clinging to the sides of the container. Not only is this wasteful, it is an environmental issue as these containers end up in landfills, where their contents will drain out over time and leach into surrounding soil. While do-it-yourselfers suffer from this aggravation, it becomes a major problem for those commercial establishments who deal with dozens of containers in a single day. These same problems exist not only for other fluids used in a motor vehicle, but for any liquid that is sold in a small-sized container.

A search of the prior art did not disclose any patents that read directly on the claims of the instant invention; however, the following references were considered related:

U.S. Pat. No. 6,273,155, issued in the name of Leonardo C. Cacho, describes an oil collecting & draining device U.S. Pat. No. 6,022,473, issued in the name of Doug Mickelson, describes an oil changing system that utilizes one oil pump.

The following patents describe a method of draining oil from a vehicle:

U.S. Pat. No. 5,975,244, issued in the name of Marion W. Mason;

U.S. Pat. No. 5,881,841, issued in the name of Marion W. Mason.

U.S. Pat. No. 5,730,870, issued in the name of Ovie L. Randolph, describes a method & apparatus for draining used oil from a motor.

U.S. Pat. No. 5,653,271, issued in the name of Charles Brittain and Gilbert B. Ross, describes an oil & oil filter collection and recycling apparatus.

U.S. Pat. No. 5,560,404, issued in the name of Rodney L. Blair and Phillip G. Chauvet, describes an improved oil drainage and disposal device.

U.S. Pat. No. 5,402,837, issued in the name of Gary H. Dietzen, describes an apparatus for changing and recycling vehicle fluids.

Consequently, a need has been felt for providing an apparatus and method which allows containers of viscous liquids to allow their contents to drain out over time before disposal.

SUMMARY OF THE INVENTION

It is therefore an object of the present invention to provide an improved liquid collection systems.

It is a feature of the present invention to provide an improved liquid collection system formed of a modularly expandable funneling system.

Briefly described according to one embodiment of the present invention, an oil and liquid manifold drain system is provided as an apparatus that allows plastic oil containers to be drained completely before disposal. The invention consists of multiple ports that hold oil cans or bottles in an upside down condition for a long period of time, envisioned to be hours. The number of ports could vary from one to several dozen, but it is envisioned that multiples of five would be common to hold all of the cans or bottles from an oil change on an automobile engine. The ports would be connected to a common manifold that would drain by gravity, back to a common container where the contents could be reused, recycled or disposed of properly. The invention could be self standing or supported from the wall. While specifically designed for motor oil, the invention could also be used for other liquids that are commonly sold in small size plastic containers and a percentage of the liquid remains clinging to the inside of the can or bottle after pouring.

The use of the present invention provides users to reclaim oil or liquid that is customarily discarded, in a manner which is not only quick, easy and effective but safe and environmentally conscious as well.

An advantage of the present invention is that it reclaims oil and other liquids that usually cling to the side of containers after pouring.

Another advantage of the present invention is that it holds bottle or can in an upside position utilizes gravity and time to completely drain oil or liquid.

Yet another advantage of the present invention is the universal funnel-shaped design holds just about any type of container.

Still another advantage of the present invention is a modular design, allowing for an adaptable number of ports.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
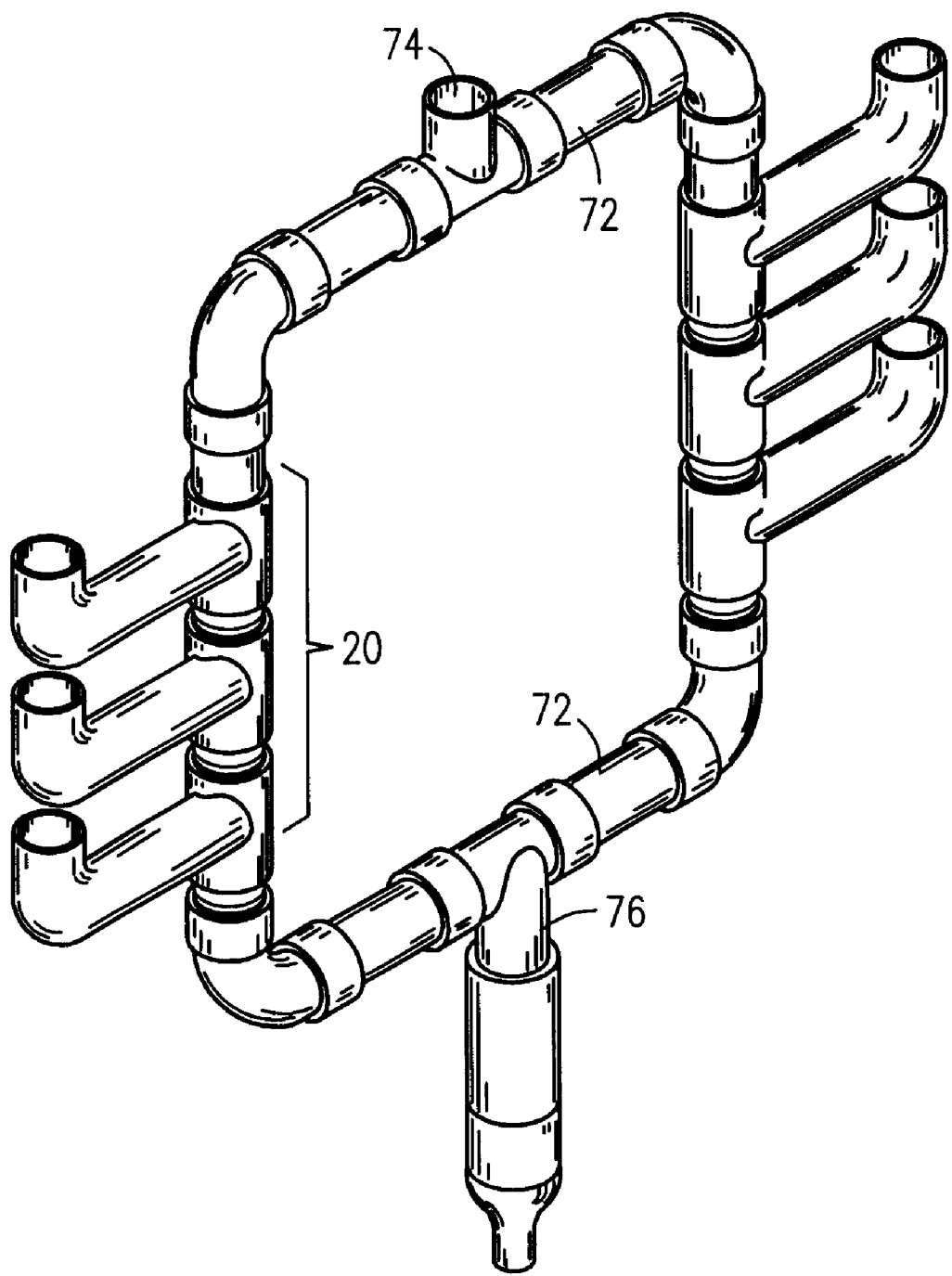
FIG. 1 is a perspective view of an oil and liquid manifold drain according to one configuration of the preferred embodiment of the present invention.

Referring now to FIG. 1, an oil and liquid manifold drain apparatus 10 is shown, according to one configuration of the present invention, as an apparatus that allows a plurality of conventionally, commercially available plastic oil containers 15 to be drained completely before disposal. Individual modular funnel elements 20 are each formed in an manner that allows for interconnection of multiple funnel elements 20.

Figure 3:
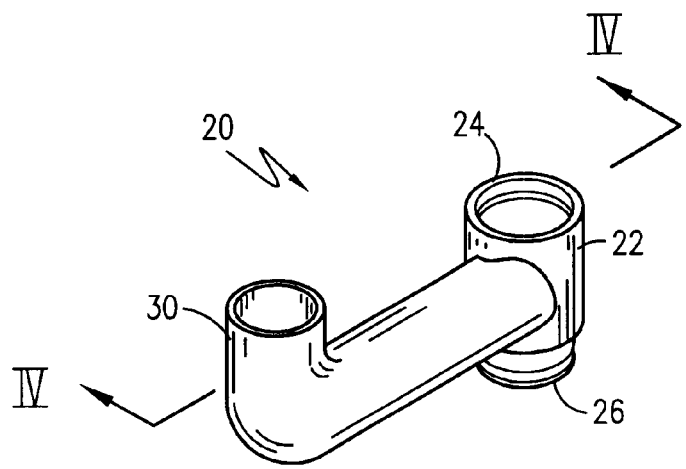
FIG. 3 is a perspective view of a modular funnel element for use therewith.
Figure 4:
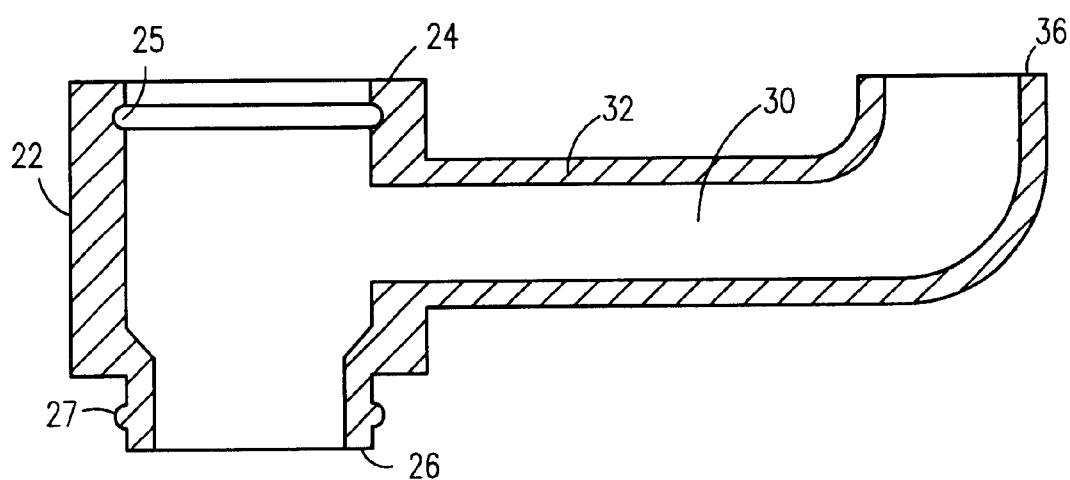
FIG. 4 is a cross sectional view taken along line IV—IV of FIG. 3.

As shown in greater detail in conjunction with FIGS. 3–4, each modular funnel element 20 has a tubular manifold segment 22 having a cylindrical outer sidewall having an upper receiving end 24 opposite a lower insertion end 26. The upper receiving end 24 forms a concave receiving groove 25 circumferentially about the inner periphery of the tubular manifold segment 22. The lower insertion end 26 similarly forms a convex retention ridge 27 circumferentially about the outer periphery of the tubular manifold segment 22 such that ridge 27 is received by and mates with a groove 25 of another element 20 when two such elements 22 are aligned together such that respective tubular manifold segments 22 are linearly aligned and mechanically compressed together. It is also envisioned that two such mechanically connected funnel elements 20 would be capable of rotating about a linearly elongated centerline drawn through the tubular manifold segments 22 for alignment purposes, as will be disclosed in greater detail below.

Each modular funnel element 20 further has a drainage conduit 30 extending radially outward from each tubular manifold segment 22. A horizontal extension tube 32 is linearly elongated and connected at one end to the manifold segment 22 and terminates at the opposite end at an upwardly directed receiving orifice 34 whose centerline is perpendicular to the centerline of the extension tube 32. The receiving orifice 34 is in fluid communication with the interior of the manifold segment 22.

Figure 2:
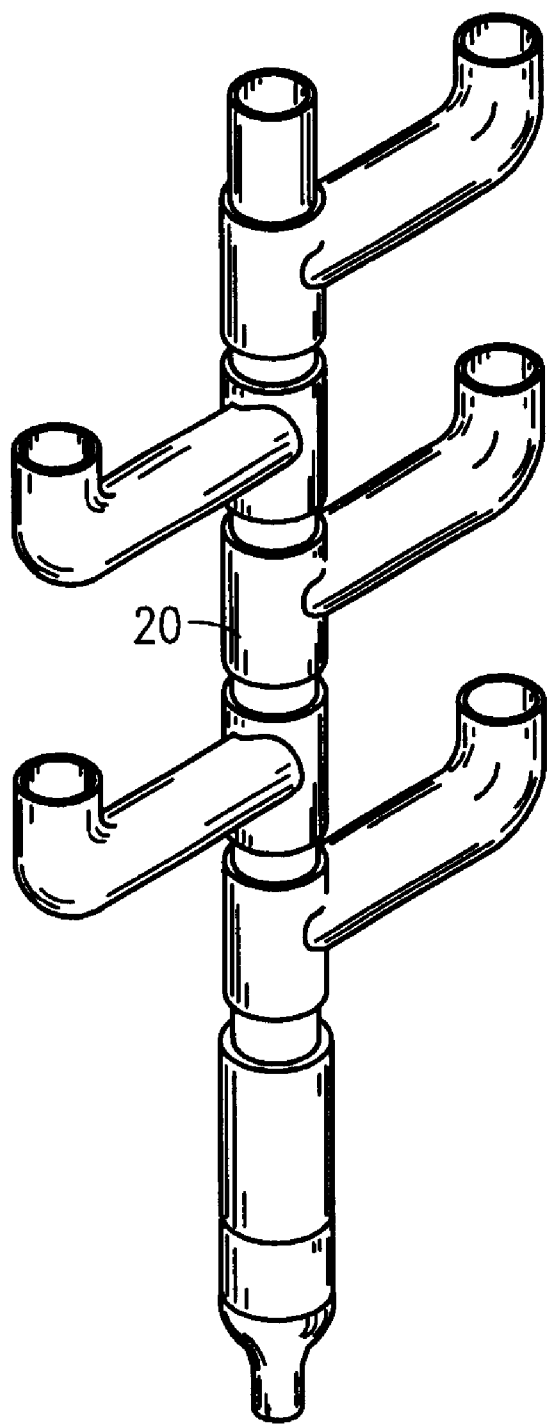
FIG. 2 is an partial elevational view thereof.

Referring now to FIG. 1 and FIG. 2, a plurality of modular funnel elements 20 are shown in a pair of exemplary configurations in order to visually describe the modular and adaptable nature of the present invention.

2. Operation of the Preferred Embodiment

In accordance with a preferred embodiment of the present invention, as shown in FIG. 1 and FIG. 2, each modular funnel element 20 has a tubular manifold segment 22 that can be connected and aligned with various other modular funnel elements 20, thereby forming a vertical drainage conduit 70, or a pair of drainage conduits 70. The funnel elements 20 can thereby be rotated for alignment purposes such as to allow unrestricted vertical access to the various receiving orifices 30 that hold oil cans or bottles 15 in an upside down condition for a long period of time, envisioned to be hours. The number of ports could vary from one to several dozen, but it is envisioned that multiples of five would be common to hold all of the cans or bottles from an oil change on an automobile engine. Where a pair of vertical drainage conduits 70 are used, a pair of horizontal connecting members 72 are used to align such assemblies in a vertically parallel manner and to provide venting 74 or a common drainage port 76.

While specifically designed for motor oil, the invention could also be used for other liquids that are commonly sold in small size plastic containers and a percentage of the liquid remains clinging to the inside of the can or bottle after pouring.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments With various modifications as are suited to the particular use contemplated. It is intended that the scope of the invention be defined by the Claims appended hereto and their equivalents. Therefore, the scope of the invention is to be limited only by the following claims.

What is claimed is:

1. An oil and liquid manifold drain apparatus that allows a plurality of conventionally commercially available plastic oil containers to be drained completely before disposal, said apparatus comprising:

individual modular funnel elements, each modular funnel element forming a tubular manifold segment having a cylindrical outer sidewall having an upper receiving end opposite a lower insertion end;

a concave receiving groove formed at said upper receiving end circumferentially about an inner periphery of said tubular manifold segment;

a convex retention ridge formed at said lower insertion end circumferentially about an outer periphery of said tubular manifold segment; and a drainage conduit extending radially outward from each tubular manifold segment;

wherein said upper receiving end is in fluid communication with the interior of said manifold segment.

2. The apparatus of claim 1, wherein said ridge is received by and mates with said groove another said element such that when two such elements are aligned together such that respective tubular manifold segments are linearly aligned and mechanically compressed together.

3. The apparatus of claim 2, wherein two such mechanically connected funnel elements are capable of rotating about a linearly elongated centerline drawn through the tubular manifold segments.

4. The apparatus of claim 1, wherein said horizontal extension tube is linearly elongated and connected at one end to said manifold segment and terminates at an opposite end at an upwardly directed receiving orifice having a centerline perpendicular to a centerline of said extension tube.

5. An oil and liquid manifold drain apparatus of claim 1, further comprising horizontal connecting members are used to align pair of funnel assemblies in a vertically parallel manner and to provide venting or a common drainage port.

* * * * *